(12) United States Patent
Kerk

(10) Patent No.: US 12,153,935 B2
(45) Date of Patent: Nov. 26, 2024

(54) METHOD FOR INITIATING A STANDBY MODE IN A CONTROL UNIT OF A MOTOR VEHICLE, CORRESPONDING OPERABLE CONTROL UNIT AND MOTOR VEHICLE

(71) Applicant: CARIAD SE, Wolfsburg (DE)

(72) Inventor: Daniel Kerk, Schwaig (DE)

(73) Assignee: CARIAD SE, Wolfsburg (DE)

( * ) Notice: Subject to any disclaimer, the term of this patent is extended or adjusted under 35 U.S.C. 154(b) by 0 days.

(21) Appl. No.: 17/989,576

(22) Filed: Nov. 17, 2022

(65) Prior Publication Data
US 2023/0153119 A1 May 18, 2023

(30) Foreign Application Priority Data
Nov. 18, 2021 (DE) .......................... 102021130154.8

(51) Int. Cl.
*G06F 1/00* (2006.01)
*G06F 1/3206* (2019.01)
*G06F 9/4401* (2018.01)

(52) U.S. Cl.
CPC .......... *G06F 9/4418* (2013.01); *G06F 1/3206* (2013.01)

(58) Field of Classification Search
CPC .... G06F 9/4418; G06F 1/3206; G06F 1/3209; G06F 1/3234; B60R 16/03
See application file for complete search history.

(56) References Cited

U.S. PATENT DOCUMENTS

| 2006/0047980 | A1 | 3/2006 | Price et al. | |
| 2014/0351619 | A1* | 11/2014 | Berry | G06F 1/3234 |
| | | | | 713/323 |
| 2018/0181411 | A1* | 6/2018 | Rothman | G06F 1/3234 |
| 2020/0293357 | A1* | 9/2020 | Goldmann | G06F 9/4418 |

FOREIGN PATENT DOCUMENTS

| DE | 69523399 T2 | 7/2002 |
| DE | 102014019435 A1 | 6/2016 |
| DE | 102014224485 A1 | 6/2016 |
| DE | 102016101582 A1 | 8/2016 |
| DE | 102019214678 A1 | 3/2021 |
| EP | 1895388 A1 | 3/2008 |
| EP | 3101510 A1 | 12/2016 |
| GB | 2429083 A | 2/2007 |

* cited by examiner

*Primary Examiner* — Xuxing Chen
(74) *Attorney, Agent, or Firm* — Seed IP Law Group LLP

(57) ABSTRACT

A method for operating a control unit of a motor vehicle, wherein a state management module of a runtime environment initiates a standby mode of the runtime environment as a function of a stop request. The invention provides that, as a function of the stop request, the state management module first sends out to at least one application a respective backup request which requests the respective application to store respective predetermined runtime data in a non-volatile data memory, and then, however, if a resume request is subsequently received within a waiting time period, the normal operating mode is continued without the planned switch-over to the standby mode.

8 Claims, 2 Drawing Sheets

METHOD FOR INITIATING A STANDBY MODE IN A CONTROL UNIT OF A MOTOR VEHICLE, CORRESPONDING OPERABLE CONTROL UNIT AND MOTOR VEHICLE

BACKGROUND

Technical Field

Embodiments of the invention relate to methods for initiating or starting a standby mode in a control unit of a motor vehicle, in order to reduce an energy consumption of the control unit when compared to a preceding normal operation mode. Embodiments of the invention also relate to a control unit operable in accordance with the method, and a motor vehicle having at least one such control unit.

Description of the Related Art

Control units of a motor vehicle are generally activated when the ignition is active and deactivated when the ignition is inactive, at least when the ignition remains off for longer than a predetermined follow-up time. The state of the ignition is signaled in the motor vehicle by an energy management system to the control units by means of an ignition-on signal or ignition-off signal. The energy management system for generating the ignition signal is also referred to as terminal control system. Thus, it may be the source of the ignition signal. Typically, however, a control unit with a microprocessor takes a relatively long time (1-2 min) until the system or runtime environment is booted up (booted) and the applications installed thereon are ready for operation. For this reason, in certain cases, the control units are not fully shut down, but rather are put into an energy-saving mode or standby mode (for example, suspend to RAM; RAM=random access memory). In this mode, the RAM content is retained, but the CPU (central processing unit-microprocessor) is suspended. The shutdown of a control unit into the standby mode, for example, Suspend to RAM state, also needs time (a few seconds or up to 1 min), inasmuch as runtime data must be stored in the flash memory, such that if there is a suspension of the voltage supply during the suspend, no information is lost.

Now, it is possible that during the shutting down (ignition off signal occurred) into the standby mode, for example, in the suspend-to-RAM mode, the ignition is once again activated by the driver (for example, because only a short stop to withdraw a parking ticket has taken place). If one would now have to wait for the control unit to first go completely into suspend or standby mode and then wake up again, time would pass unnecessarily, which would be perceptible or unwanted by the driver. The functionality of the control unit is limited during this time. This spontaneous switching on of the ignition again shortly after it has been switched off is also called a "change of mind", which is to say it is a double switch-over of the ignition state (ignition off and again ignition on), which occurs in shorter time period than is possible for a full switch-over to standby mode.

In this context, it is known from EP 3 101 510 A1 that, after detection of an ignition-off signal, a predetermined period of time is first waited until a control unit is placed in standby mode, which is to say for example, until it switches over to the described suspend-to-RAM state. However, if the initiation of the standby mode is started after this period of time and the described "change of mind" then occurs, the complete routine for the initiation of the standby mode must first be executed before the routine for starting the normal operating mode can be reinitiated. This leads to the described delay brought about by shut-down of the switch-over to standby mode and the subsequent switch-over to wake-up to normal operating mode that is only possible afterwards.

How to prevent a standby mode from being initiated too early after detection of an ignition-off signal by introducing additional waiting time periods is also known from DE 10 2014 019 435 A1.

How the power consumption of electrical power in control units can be controlled in a motor vehicle by means of an energy management system as a function of an ignition signal or ignition is described, for example, in DE 10 2016 101 582 A1.

BRIEF SUMMARY

Some embodiments avoid a delay in the operational readiness of the control unit in a motor vehicle in the case of the "change of mind" situation described here above, in which the ignition of the motor vehicle is switched on again during the switch-over from a normal operating mode to a standby mode.

Some embodiments comprise a method for operating a control unit of a motor vehicle, wherein a runtime environment with at least one application is executed in a processor circuit of the control unit in a normal operating mode, and a state management module of the runtime environment initiates a standby mode of the runtime environment, in which, as a function of a stop request from an external coordination unit, the operation of the runtime environment is suspended. The stop request represents a request to switch over to the standby mode.

The processor circuit provided in the control unit can, for example, comprise at least one microprocessor and/or at least one SOC (System On Chip). The runtime environment of the processor circuit can, for example, be implemented on the basis of an operating system and/or a virtual machine. As will be explained further on, the runtime environment is in particular an AUTOSAR runtime environment (in particular an "adaptive AUTOSAR" environment). The respective application that is executed in the runtime environment can, for example, be implemented by application software (application program) or run as a process or as a so-called service or daemon in the runtime environment. By means of the respective application, it is, for example, possible that a media playback or a display control or a communication stack (protocol stack) of at least one display of the motor vehicle can be implemented, to name only examples of applications. The state management module of the runtime environment ensures that the at least one application is informed about or prepared for the upcoming switch-over from normal operation mode to standby mode. For this purpose, the state management module may be implemented as a software. The "requests" described in this description, which is to say for example, the stop request, can each be designed, for example, as a signal or message or message packet. A request can generally be transmitted, for example, via an API (Application Programming Interface) and/or by means of a communication protocol. The coordination unit can be provided outside the runtime environment, which is to say externally, for example as a microcontroller of the control unit. The coordination unit may, for example, receive an ignition-off signal from the motor vehicle, for example, via a communication bus, for example a CAN bus (CAN—Controller Area Network) or an Ethernet network of the motor vehicle, and thereupon send out the stop request to the state management module. The coordination unit may additionally or alternatively evaluate another signal source for a stop request. The standby mode may be, for example, the described suspend-to-RAM mode or another sleep mode or operating mode having a reduced electrical power consumption when compared to the normal operating mode. By suspending the runtime environment, the at least one application is also stopped or suspended. For this purpose, for example, a program counter of the processor circuit may be suspended and/or at least one sub-circuit of the processor circuit may be switched off.

In order to be able to respond quickly to a restart of the motor vehicle after receipt of the stop request, even though the standby mode has already been initiated, the method for switch-over from normal operating mode to standby mode comprises that, as a function of the stop request, the state management module initially only sends a respective backup request to the at least one application, which requests the respective application to store respective predetermined runtime data in a non-volatile data memory. After a predetermined waiting time period has passed since the backup request has been sent out or at least after the waiting time period, the state management module checks whether a predetermined resume request is received from the coordination unit. The waiting time period may, for example, be in the range of 30 seconds to 5 minutes. The resume request signals that no standby mode is to be initiated after all, but rather that normal operation is once again necessary.

If the resume request is not received within the waiting time period, which is to say the switch-over to standby mode remains necessary, the state management module sends a deactivation request to the respective application, which deactivation request requests the respective application to deactivate at least one predetermined functionality requiring normal operation, and then the runtime environment is switched over from normal operation mode to standby mode. If, on the other hand, the resume request arrives within the waiting time period, which is to say there is no further need for standby mode (notwithstanding the switch-over has already been initiated), the normal operation mode is continued without switching over to standby mode.

In other words, the switch-over from the normal operating mode to the standby mode is executed in two stages or phases. Some embodiments are based on the recognition that the switch-over from the normal operating mode to the standby mode therefore comprises the aforementioned longer period of time of, for example, 1 to 2 minutes, inasmuch as the at least one application, wherein, in particular, it is a matter of several applications, must first store its state data or runtime data in the non-volatile data memory. It has however been shown that this can also already be executed by an application without it needing for this purpose to restrict its functionality when compared to the normal operating mode, but rather it can continue to operate in the same manner as in the normal operating mode. This is now used by only saving the runtime data in the first phase and sending the backup request to the respective application by means of the state management module. However, the application continues to run as in normal operating mode, it merely prepares the switch-over to standby mode.

Thereinafter, the state coordination module checks whether the ignition may have been switched on again or whether the resume request of the coordination unit is generally present or received, which is to say whether the switch-over to standby mode is to be canceled. If this is the case, the normal operating mode can now be continued or resumed without suspension. The reason for this is that while the runtime data is being stored, operation of the at least one application continues without suspension and/or without change. The runtime data to be stored may comprise, for example, the current display state of a display and/or an operating state in an operating menu and/or the playback state of a media file, to name but a few examples. This involves such information which is necessary for the application to continue its functionality from the point where it was suspended by the initiation of standby mode after "waking up" or subsequent to a restart after or from a standby mode.

Some embodiments are based on the recognition that the non-reversible switch-over from the normal operating mode to the standby mode must only be made after the runtime data has been stored, which switch-over can then however be executed in a shorter runtime, for example, within 200 milliseconds. Only then is the suspension of at least one functionality or its deactivation necessary. The functionality requiring normal operation will be described in more detail below. By way of example, it may here be the operation of a network communication link that must be suspended or shut down when the runtime environment is suspended, since it is then no longer possible for the application to respond to messages from the communication network.

In some embodiments, for the time period of the saving of the runtime data, during the initiation or during the switch-over from the normal operating mode to the standby mode, it is still possible to respond to a resume request from the coordination unit, which is to say for example, for a restart of the ignition, by further executing or further operating the at least one application without suspension.

Some embodiments include a single runtime environment, which is prepared for the switch-over to standby mode and is then suspended. Of course, a number of such runtime environments may be executed in a control unit, some or all of which may then be handled in accordance with the method. Since this is possible for each runtime environment either separately or independently, only one runtime environment is referred to in the following, but a single runtime environment or several runtime environments may be operated in the control unit in the manner described. Runtime environments may be based, for example, on operating systems or virtual machines or other isolation mechanisms, such as container technologies, cgroups, namespaces, to name but a few examples.

Some embodiments include further developments through which additional advantages are obtained.

A further development comprises that the stop request is generated by the coordination unit if an ignition-off signal is generated in the motor vehicle for switching off an electrical system of the motor vehicle. As explained above, the switch-over of a control unit from the normal operation mode to the standby mode, which is to say an operation mode with an electrical power consumption that is reduced when compared to the normal operation mode, may be preferred for the case when the ignition is turned off in the motor vehicle. It should be noted that in a purely electric motor vehicle, "ignition" refers to the operation of the on-board electrical system and/or the at least one drive motor. There, too, a corresponding ignition-on signal and an ignition-off signal may be used. The ignition can be switched or controlled by an ignition key or a remote key or a start-stop operating unit. In addition, or as an alternative to the ignition, the coordination unit can execute the stop request as a function of an energy consumption control system provided in the motor vehicle and/or a management system for computing resources if, for example, the control unit is to be, for example, switched off because it is not needed in the current driving operation and/or another control unit takes over its tasks.

A further development comprises that a predetermined buffer time period is waited out by the coordination unit after or from the point in time of detection of the ignition-off signal and the stop request is only sent to the state coordination module if an ignition-on signal is absent within the buffer time period. A buffer time period can, for example, be in a range of one second to five minutes. The buffer time period can provide additional protection or compensation for the described "change of mind" situation. If a user of the motor vehicle switches off the ignition of the motor vehicle and then switches it on again within the buffer time period, the initiation of the standby mode, which is to say the sending of the respective backup request to the at least one application, does not even occur. In this manner, it is also possible to avoid the unnecessary saving of the runtime data in this case.

A further development comprises that the state management module sends the respective backup request only to that at least one application which has previously registered for notification with the coordination unit by means of a registration request. In other words, only such an application is notified or prepared by the state management module by means of a backup request that has previously registered by means of a registration request. This has the advantage that waiting for runtime data to be saved, which after all causes the slowdown or delay when switching from the normal operation mode to the standby mode in the manner described, only occurs for those applications that signal, by means of the registration request, that they have runtime data that needs to be saved. It is likewise an advantage that there is less communication overhead because the state management system needs to communicate with fewer applications.

A further development comprises that it is detected by the state management module which registered application signals a successful completion of the save operation within the waiting time period by a done message. At the end of the waiting time period, each remaining registered application is forcibly terminated, which is to say terminated from outside the application. Through the respective done message, it is thus known in the state management module which application was able to successfully save its runtime data to the data memory. For each remaining registered application that has not signaled completion or termination of saving its runtime data within the waiting time period by means of a done message, forced termination can then be used to ensure that this application is transferred to a known state and/or that the transition to the standby state is not arbitrarily delayed. Forced termination can be executed, for example, by means of a scheduler of the runtime environment. An example is a so-called kill signal for terminating a software process of the application.

A further embodiment comprises that upon switch-over to the standby mode, a current system state or working memory content of the runtime environment from the normal operation mode is kept stored in a volatile data memory, RAM, of the processor circuitry using suspend-to-RAM during the standby mode. By having the standby mode also provide for the suspend-to-RAM state, once the standby mode is initiated or reached, the switch back to the normal operation mode can be accomplished with limited time required.

A further embodiment comprises that the deactivation of the at least one predetermined functionality which requires normal operation comprises:
  closing of at least one predetermined file, and/or
  stopping of a timer, and/or
  terminating a network connection.

Regarding these functionalities, it has proven to be advantageous if they are suspended or deactivated or stopped during the standby mode. In this way, messages and/or signals in the control unit are prevented from remaining unhandled or unprocessed and thereby causing, for example, a hardware of the control unit to be switched or enter an error state.

A further development comprises that the runtime environment is an AUTOSAR runtime environment. In connection with the AUTOSAR runtime environment, it has proven to be particularly advantageous to be able to suspend or cancel the switch-over from normal operation mode to standby mode. An AUTOSAR runtime environment here can otherwise cause a particularly long time or a particularly long delay in waking up or continuing the at least one application of a control unit in the "change of mind" situation described. In particular, an application in "adaptive AUTOSAR" is provided.

Some embodiments comprise a control unit for a motor vehicle, wherein the control unit has a processor circuit in which a runtime environment for operating at least one application is set up, wherein the control unit has a coordination unit (microcontroller) for coordinating or matching an operation of the control unit with an energy management system, wherein the runtime environment correspondingly has the state management module, which is set up to initiate a standby mode of the runtime environment as a function of a stop request of the coordination unit. This configuration of the control unit can include a runtime environment in the control unit that can communicate with a coordination unit by means of a state management module such that the coordination unit can, for example, "shut down" the control unit in response to an ignition-off signal, which is to say switch off at least one hardware component and thereby also stop the operation of the runtime environment. In order for the runtime environment to be prepared for this, the coordination unit can now inform the runtime environment or trigger its preparation before "shutting down" or switching off the control unit.

In order for the respective application to respond thereto, the application is set up to store predetermined runtime data in a non-volatile data memory for a switch-over to a standby mode as a function of a backup request from the coordination unit and, once this runtime data has been stored, to signal this to the state management module by means of a done message, and thereinafter to deactivate at least one predetermined functionality requiring normal operation only upon receipt of a further request from the state management module, namely the deactivation request. Overall, the control unit is set up to execute an embodiment of the method described herein.

Thus, some embodiments provide for an additional interface and/or an additional communication protocol in order to be able to react in the case that during the preparation for the switch-over from the normal operation mode to the standby mode a further operation of the control unit is again required or requested by the coordination unit, and therefore a resume request is sent from the coordination unit to the state management module. The additional interface and/or the additional communication protocol thus provides for a further development of the respective application in that it is prepared for the standby mode in two stages or two phases, namely that first a save request is provided for saving the runtime data, and the application signals its readiness or that saving has been successfully completed by means of the done message. Only then does the change or restriction of the functionality of the application take place, in that it deactivates or restricts the at least one functionality by means of a second request, namely the deactivation request. Until then, which is to say until the deactivation request is received, the application may continue to be provided to the user of the motor vehicle without any change with respect to the normal operating mode. Meanwhile, the saving of the runtime data can take place in the background or simultaneously. If the switch-over from the normal operating mode to the standby mode is then suspended or canceled before the deactivation request is generated, which is to say if a resume request is sent by the coordination unit to the standby mode, this can be implemented or compensated for in accordance with the method in such a way that the at least one application continues to be operated without suspension.

The processor circuit of the control unit represents a data processing device or a processor device which is set up to carry out an embodiment of the method described herein. For this purpose, the processor circuit may comprise at least one microprocessor and/or at least one microcontroller and/or at least one FPGA (field programmable gate array) and/or at least one DSP (digital signal processor). Furthermore, the processor circuit may comprise program code which is set up to execute the embodiment of the method described herein when executed by the processor device. The program code may be stored in a data memory of the processor circuit.

Some embodiments comprise a motor vehicle with at least one embodiment of the control unit described herein, wherein an energy management system is provided in the motor vehicle, which is coupled to a respective coordination unit of the respective control unit for transmitting an ignition-off signal and an ignition-on signal. The motor vehicle may be configured as a motor vehicle, in particular as a passenger car or truck, or as a passenger bus or motorcycle.

As already described above, the energy management system can, for example, include monitoring a start-stop control element (for example, a start-stop button) and/or an ignition lock and/or a radio key to determine whether a user of the motor vehicle wishes to switch off (ignition off) or switch on (ignition on) the ignition and/or the electrical system of the motor vehicle. A corresponding energy management system may be included. A distribution of the ignition-off signal or the ignition-on signal to the respective control units of the motor vehicle may be performed. In the motor vehicle, it is now possible to react to a switch-over or a sequence of an ignition-off signal and then an ignition-on signal with a continuous further operation of the at least one application in each control unit if the ignition-on signal is generated even before the respective deactivation request is sent to the at least one application.

Methods described herein may include features described with respect to control units herein.

Some embodiments combine the features of the described embodiments. Thus, embodiments also encompass implementations which each have a combination of the features of several of the described embodiments, provided that the embodiments have not been described as mutually exclusive.

DETAILED DESCRIPTION

The described components of the embodiments each represent individual features that are to be considered independently of one another, each of which also independently further develop embodiments. Therefore, the disclosure is intended to include combinations of the features of the embodiments other than those shown. Furthermore, the described embodiments may also be supplemented by further features beyond those already described.

In the figures, identical reference signs denote elements having the same respective function.

Figure 1:
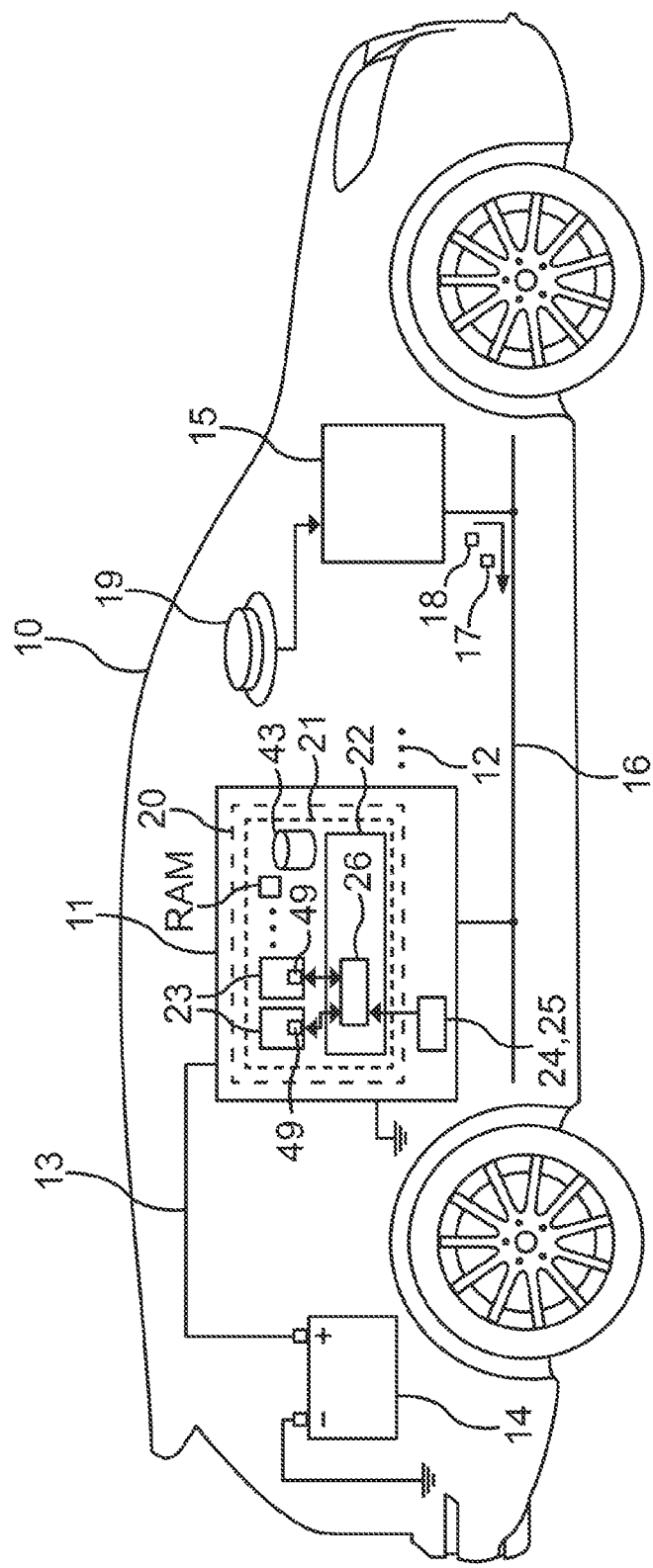
FIG. 1 shows a schematic diagram illustrating an embodiment of a motor vehicle.

FIG. 1 shows a motor vehicle 10, which may be a motor vehicle, in particular a passenger car or truck. At least one control unit 11 may be provided in the motor vehicle 10, by means of which at least one vehicle function may be provided in the motor vehicle 10, for example the operation of an infotainment system and/or a display and/or a media reproduction and/or the control of the drive engine, to name but a few examples. Ellipses 12 are intended to indicate that more than the one control unit 11 shown may be provided.

The at least one control unit 11 may be supplied with electrical power by an electrical system 13 of the motor vehicle 10. The electrical system 13 may include, for example, an electrical battery 14.

When the motor vehicle 10 is switched off or turned off by a user (not shown), which is to say an ignition of the motor vehicle 10 is switched off, in this manner it may be provided for the at least one control unit 11 to be switched over from a normal operation mode, such as may be provided for a driving operation of the motor vehicle 10, to a standby mode, such as may be provided a suspend-to-RAM mode. Related information or a signal that the motor vehicle is in an ignition-on state (ignition switched on, normal operating mode required for the control unit 11) or an ignition-off state (standby mode required for the control unit 11) can be signaled, for example, by an energy management system 15 in the motor vehicle 10, for example, via a communication network 16, by an ignition-off signal 17 and an ignition-on signal 18. The switch-over between the ignition-on state and the ignition-off state can be executed, for example, by a user using a start-stop button 19, although this is only an example. Any mechanism or logic for switching over between ignition-on and ignition-off may be provided.

In the control unit 11, the at least one device function may be implemented by means of a processor circuit 20, by means of which at least one runtime environment 21 may be executed. The processor circuit 20 may, for example, be based on at least one microprocessor and/or at least one SOC (system on chip). The runtime environment 21 may, for example, be based on a virtual machine and/or at least one operating system 22. The runtime environment 21 is, in particular, an AUTOSAR runtime environment. In particular, at least one application program or at least one application 23 can be executed by means of the runtime environment 21, in order to implement the respective vehicle function. The runtime environment 21 can be informed about the current state (ignition-on or ignition-off) by a coordination unit 24, which can be implemented, for example, by a microcontroller 25, which can be in turn be implemented, for example, in an electrical power supply unit of the control unit 11. The control unit 11 can be connected, to the on-board electrical system 13 by means of the power supply unit, in order to draw electrical power. If an ignition-off signal 17 is received in the control unit 11, this can be signaled by the coordination unit 24 in the runtime environment 21 to a state management module 26, which thereupon prepares the at least one application 23 for the switching over from the normal operating mode to the standby mode in the manner described below.

Figure 2:
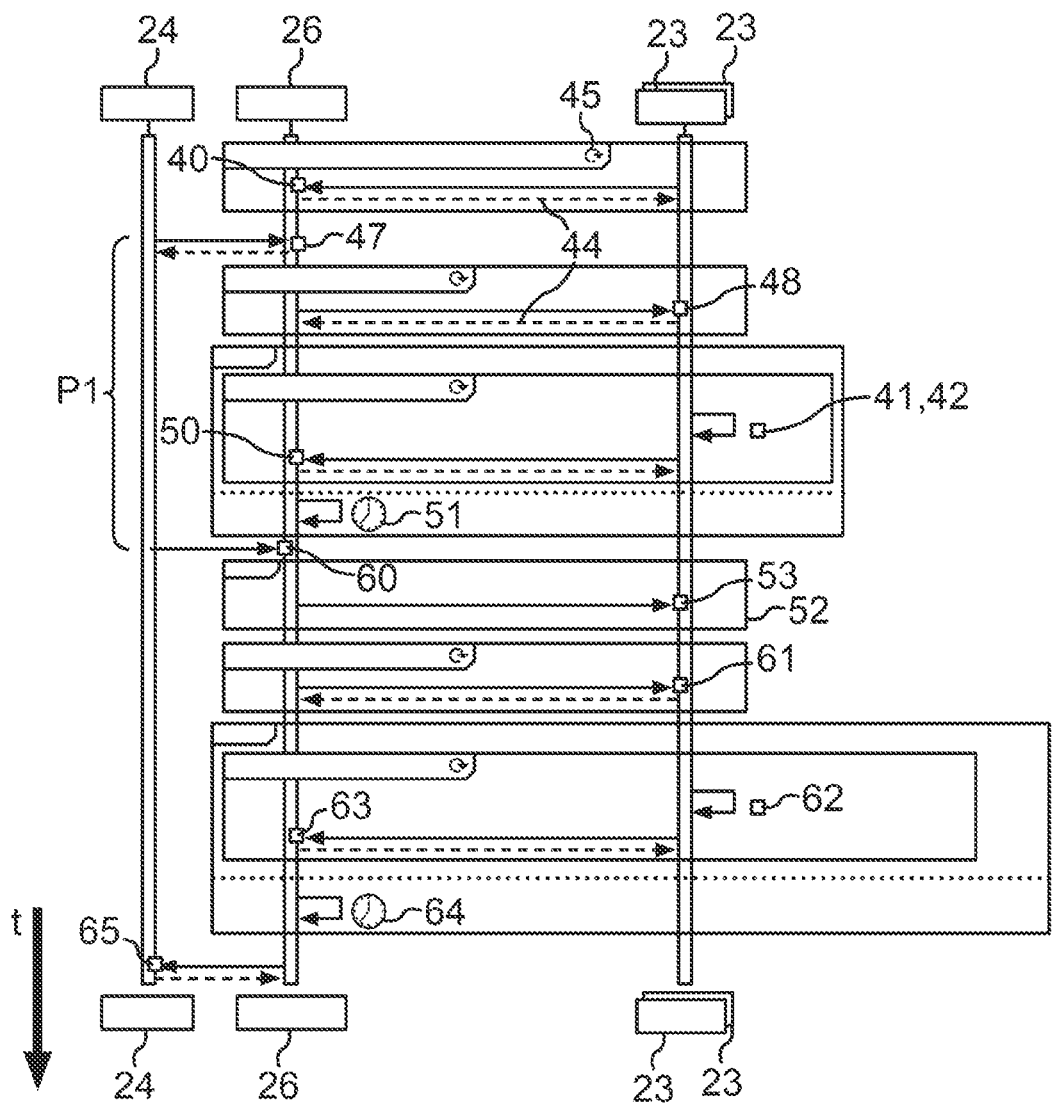
FIG. 2 shows a schematic diagram illustrating an embodiment of a method.

The sequence for switching over from the normal operating mode to the standby mode is described below with reference to FIG. 1 making additional use of FIG. 2. FIG. 2 illustrates a message exchange or exchange of requests between the coordination unit 24, the state management module 26 and the at least one application 23, over a time period t.

The at least one application 23 can signal, by means of a registration request 40 to the state management module 26, that, in the event that a switch-over from the normal operating mode to the standby mode occurs, the respective application 23 should previously store the respective state data or runtime data 41 by means of a save procedure 42 in a non-volatile or permanent data memory 43, for example, a flash memory, in order to be able to restore the operating state or the state of the application 23 in the event of a voltage dip or an electrical voltage interruption, which is to say an interruption of voltage from the vehicle electrical system 13. In FIG. 2, it is illustrated by dashed arrows 44 that a respective request or a respective response message (for example, acknowledge) can be provided with a corresponding confirmation as a response (only two of the response messages are provided with a reference sign). In FIG. 2, it is further indicated by FOR-loops or loops 45 that the respective illustrated or depicted process is applied for each application 23 ("for each registered application").

If an ignition-off signal 17 is now received in the control unit 11 from the energy management system 15 and this is received or detected by the coordination unit 24, the coordination unit may send a stop request 47 to the state management module 26. The state management module 26 may then subsequently transmit or broadcast to each registered application 23 a backup request 48 via a corresponding API or interface 49 of the application 23. This may cause the save procedure 42 to be executed in the respective application 23 to save the runtime data 41 to the data memory 43. Upon successful completion of the save procedure 42, if all runtime data 41 has been saved to the data memory 43 or non-volatile data memory, this can be signaled by a done message 50 from the respective application 23 to the state management module 26.

This completes a first phase P1 of the switch-over from the normal operation mode to the standby mode. This first phase P1 may, for example, take a total time of 0.5 seconds to 2 minutes. Within the first phase P1, the respective application 23 can continue to be operated without change for the normal operating mode.

If an ignition-on signal 18 is now generated in the motor vehicle 10 during the first phase P1 and thus a continuation or resume of the normal operating mode is requested for the control unit 11, this ignition-on signal 18 is available to the coordination unit 24 and the coordination unit can, for example, after the waiting time period 51 has elapsed, signal by means of a resume request 60 to the runtime environment 21, in particular to the state management module 26, that the switch-over from the normal operating mode to the standby mode is to be canceled or suspended and the normal operating mode is to be continued instead.

After a predetermined waiting time period 51 has elapsed, a check may be made to determine whether all registered applications or each registered application 23 has sent the done message 50. In an optional step 52, a termination signal 53, for example a so-called kill signal, can be sent for each registered application 23 that has not sent a done message within the waiting time period 51 in order to forcibly terminate the respective application 23 or to shift it to an already known state.

Thereupon, it is possible for the switch-over to the standby mode to be canceled or suspended. The respective application 23 does not have to be prepared further for this purpose. Although the application has temporarily stored or saved its runtime data 41 in the data memory 43, it has not changed its operation in the process. Thus, the normal operating mode can hereinafter immediately be continued or resumed. A user of the motor vehicle 10 does not notice any suspension in the operation of the control unit 11 due to the sending of the ignition-off signal 17 and thereupon the sending of the ignition-on signal 18 within the duration of the first phase P1.

On the other hand, if at the end of the waiting time period 51 there is no resume request 60 at the state management module 26, the switch-over to the standby mode may be continued. For this purpose, a deactivation request 61 may be sent for each registered application 23, causing the application 23 to terminate its sequence or operation intended for the normal operation mode.

For this purpose, each application 23 may execute a degradation or restriction 62 of at least one functionality that might otherwise, for example, result in error signals in the standby mode. By way of example, a timer may be stopped and/or a network connection may, for example, be interrupted or suspended for the communication network 16.

It can be provided that each application 23 signals the successful termination or deactivation or restriction 62 of the respective functionality to the state management module 26 via a ready message 63. The state management module may provide that a predetermined hold time period 34 is waited out after the sending out of the deactivation request 61. This gives the respective application 23 time to apply the restriction 62 to the functionality, which is to say to disable the functionality. Thereinafter, a suspend-done message or suspended message 65 may be transmitted or sent to the coordination unit 24 by the state management module 26. This provides the coordination unit 24 with information that the runtime environment 21 is now ready for standby mode. In response, the coordination unit 24 can control that, for example, at least one circuit part of the processor circuit 20 is switched over without voltage and/or is de-energized and/or a program counter of the processor circuit 20 is suspended. Corresponding control options for microprocessors may be provided. It may hereby be provided that a content of a volatile memory or RAM is maintained stored, which is to say the RAM continues to be supplied with electrical voltage and thereby retains the content of its memory.

If the ignition-on signal 18 is then sent by the energy management system 15, the at least one application 23 can once again be continued in the state or at the operating point as has been stored in the RAM, by commissioning or switching on or "waking up" the processor circuit 20. If, in the meantime, a power supply to the RAM is suspended, thereby erasing the volatile RAM, each application 23 can nevertheless once again be continued at the operating point stored or described by the runtime data 41 from the data memory 43 based on its runtime data 41.

The software platform or runtime environment may provide for an operating system (OS—operating system) and basic framework components that provide basic functionality and services to applications. The software platform is integrated on a microprocessor control unit. The state manager (state management module) is a component of this platform. Examples of applications are: charge management, battery management or positioning. Applications register with the state manager when they need to execute certain actions such as storing persistent data in flash. After registration, they are informed by the state manager when the system should go into suspend.

To solve the "change of mind" problem, the software platform takes a two-stage approach.

In the first stage, the state manager notifies the application that the system should go into suspend (standby mode with suspend-to-RAM). The state manager is the component that orchestrates the entire start-up and shut-down and power management. The state manager receives the information that the system should go into suspend from a central coordinator (coordination unit) on the microcontroller of the control unit. The state manager then contacts all applications to inform them. During this phase, the applications store their data in the non-volatile flash data memory. This may last a longer time. During this time, the application must continue to be fully functional, such that no restrictions are visible to the driver.

This first phase P1 can, for example, last up to one minute. If during this time period the central coordinator detects that the ignition has been turned back on, the coordinator sends a resume request to the state manager. The state manager knows that the system is still in the first phase of suspend. The application is notified that the suspend has been interrupted, but otherwise does not need to start any further actions. The resume/further operation can take place virtually immediately. Only when all applications have reported the successful saving of the persistent runtime data does the state manager move on to phase 2. In this phase, it informs the applications that they may now need to restrict their functions (for example, close files, stop timers, terminate network connections, etc.). This phase 2 cannot be canceled, but in terms of time also only lasts a few milliseconds.

The idea is relevant for the AUTOSAR standard, in particular adaptive AUTOSAR, since the AUTOSAR standard 20-11 does not currently support suspend-to-RAM at all. The mentioned interface between the state manager and the application does not yet exist there.

An implementation in adaptive AUTOSAR can be achieved, for example, by integrating the state management module 26 into the AUTOSAR state manager. This could interact with the applications via ara::com interfaces (registration request 40, stop request 47, backup request 48, done message 50, deactivation request 61, ready message 63, suspended message 65). As an alternative, communication with the state manager could be implemented in a dedicated library that implements communication via interprocess communication.

Communication with the coordination unit 24 must be solved in an integration-specific manner (for example, via UART, Ethernet). The AUTOSAR standard does not specify any requirements here.

Overall, the examples show how a two-stage suspend-to-RAM system can be provided.

German patent application no. 10 2021 130154.8, filed Nov. 18, 2021, to which this application claims priority, is hereby incorporated herein by reference, in its entirety.

Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a control unit of a motor vehicle, wherein a runtime environment with at least one application is executed in a processor circuit of the control unit in a normal operating mode, the method comprising:
   initiating a standby mode of the runtime environment, by a state management module of the runtime environment, in which the operation of the runtime environment is suspended, as a function of a stop request from an external coordination unit if an ignition-off signal for switching off an electrical system of the motor vehicle is generated in the motor vehicle, wherein a predetermined buffer time period is waited out by the external coordination unit after detection of the ignition-off signal, and the stop request is transmitted only if an ignition-on signal is absent within the predetermined buffer time period,
   as a function of the stop request, sending out a respective backup request, by the state management module, to the at least one application, which backup request requests the respective application to store respective predetermined runtime data in a non-volatile data memory,
   after the backup request has been sent out, checking for a predetermined waiting time period, by the state management module, whether a predetermined resume request is received from the coordination unit,
   if the resume request is not received within the waiting time period, sending a deactivation request, by the state management module, to the respective application, which deactivation request requests the respective application to deactivate at least one predetermined functionality requiring normal operation, and thereinafter the runtime environment is switched over from the normal operation mode to the standby mode, and
   if the resume request is received within the waiting time period, continuing the normal operation mode without switching over to the standby mode.

2. The method according to claim 1, wherein the state management module sends the respective backup request only to that at least one application which has previously registered with the external coordination unit by a registration request.

3. The method according to claim 2, wherein the state management module detects which registered application signals a successful completion of the save operation by a done message within the waiting time period, and at the end of the waiting time period each remaining registered application is forcibly terminated.

4. The method according to claim 1, wherein in the switch-over to standby mode, a current working memory content of the runtime environment from the normal operation mode is maintained stored in a volatile RAM of the processor circuit by suspend-to-RAM during the standby mode.

5. The method according to claim 1, wherein the deactivation of the at least one predetermined functionality requiring normal operation comprises:
   closing of at least one predetermined file; and/or
   stopping of a timer; and/or
   terminating a network connection.

6. The method according to claim 1, wherein the runtime environment is an AUTOSAR runtime environment.

7. A control unit for a motor vehicle, comprising:
a processor circuit in which a runtime environment for operating at least one application is set up,
a coordination unit for coordinating operation of the control unit with an energy management system,
wherein the runtime environment has a state management module which is set up to initiate a standby mode of the runtime environment as a function of a stop request of the coordination unit,
wherein the application is set up to store predetermined runtime data in a non-volatile data memory for a switch-over to the standby mode as a function of a backup request from the coordination unit, and after storage has taken place to signal this to the state management module by a done message, and thereinafter to deactivate at least one predetermined functionality requiring normal operation only upon receipt of a deactivation request from the state management module, and
wherein the control unit is set up to execute a method comprising:
initiating the standby mode of the runtime environment, by the state management module of the runtime environment, in which the operation of the runtime environment is suspended, as a function of the stop request from the external coordination unit if an ignition-off signal for switching off an electrical system of the motor vehicle is generated in the motor vehicle, wherein a predetermined buffer time period is waited out by the external coordination unit after detection of the ignition-off signal, and the stop request is transmitted only if an ignition-on signal is absent within the predetermined buffer time period,
as a function of the stop request, sending out the respective backup request, by the state management module, to the at least one application, which backup request requests the respective application to store respective predetermined runtime data in the non-volatile data memory,
after the backup request has been sent out, checking for a predetermined waiting time period, by the state management module, whether a predetermined resume request is received from the coordination unit,
if the resume request is not received within the waiting time period, sending the deactivation request, by the state management module, to the respective application, which deactivation request requests the respective application to deactivate at least one predetermined functionality requiring normal operation, and thereinafter the runtime environment is switched over from the normal operation mode to the standby mode, and
if the resume request is received within the waiting time period, continuing the normal operation mode without switching over to the standby mode.

8. A motor vehicle having at least one control unit according to claim 7, wherein an energy management system is provided in the motor vehicle, which is coupled to a respective coordination unit of the respective control unit for transmitting an ignition-off signal and an ignition-on signal.

* * * * *